(12) United States Patent
Koulik et al.

(10) Patent No.: US 9,732,299 B2
(45) Date of Patent: Aug. 15, 2017

(54) METHOD AND DEVICE FOR TREATING TWO-PHASE FRAGMENTED OR PULVERIZED MATERIAL BY NON-ISOTHERMAL REACTIVE PLASMA FLUX

(71) Applicant: ABENZ 81-40, Geispolsheim (FR)

(72) Inventors: Pavel Koulik, Blaescheim (FR); Anatoly Saychenko, Illkirch Graffentaden (FR)

(73) Assignee: ABENZ 81-40, Geispolsheim (FR)

( * ) Notice: Subject to any disclaimer, the term of this patent is extended or adjusted under 35 U.S.C. 154(b) by 60 days.

(21) Appl. No.: 14/647,069

(22) PCT Filed: Nov. 18, 2013

(86) PCT No.: PCT/FR2013/000299
§ 371 (c)(1),
(2) Date: May 22, 2015

(87) PCT Pub. No.: WO2014/076381
PCT Pub. Date: May 22, 2014

(65) Prior Publication Data
US 2016/0145520 A1    May 26, 2016

(30) Foreign Application Priority Data

Nov. 19, 2012   (FR) ...................................... 12 03092
Oct. 9, 2013    (FR) ...................................... 13 02349

(51) Int. Cl.
*C10L 9/08*     (2006.01)
*C10L 5/04*     (2006.01)
(Continued)

(52) U.S. Cl.
CPC ............. *C10L 9/083* (2013.01); *B01J 19/088* (2013.01); *B01J 19/2405* (2013.01);
(Continued)

(58) Field of Classification Search
USPC .......................................... 44/606, 607, 629
See application file for complete search history.

(56) References Cited

U.S. PATENT DOCUMENTS

| 4,489,041 A | 12/1984 | Wong |
| 6,355,312 B1 | 3/2002 | Fornsel |
(Continued)

FOREIGN PATENT DOCUMENTS

WO   2011119274 A1   9/2011

OTHER PUBLICATIONS

International Search Report completed Apr. 25, 2014 in International Application PCT/FR2013/00029.

*Primary Examiner* — Chantel Graham
(74) *Attorney, Agent, or Firm* — Young Law Firm, P.C.

(57) ABSTRACT

Method and device implemented in a reactor for the plasma treatment of carried fragmented material or of pulverized elements by a support gas where the main element is an intermediate temperature plasma (PIT) generator fed by a source of electric pulses, the amplitude of whose current is limited and for which the generating frequency, the duration of the pulses and the duration of the time spans between the pulses are determined in such a way as to generate a nonthermal plasma (PIT) of large extent, the plasma and the carrier gas flux (4) laiden with the fragments of material or of pulverized elements to be treated (5) moving along helical trajectories coaxial with the axis of the reactor at controlled angles a and B respectively relative to the plane perpendicular to the axis of the reactor, the angles a and B being able to vary in a given manner according to the properties of the material to be treated and the technological parameters and the dimensions of the reactor. Use of the invention both for the combustion of combustible powders in the boilers of electric power plants and for the generation of solid or gaseous combustible products, of given properties and
(Continued)

dimensions, effected through the organization of plasmo-chemical reactions on fragments or pulverized elements of organic materials in the reactor.

11 Claims, 6 Drawing Sheets

(51) Int. Cl.
    *C10B 19/00*      (2006.01)
    *C10L 5/44*      (2006.01)
    *B01J 19/08*      (2006.01)
    *B01J 19/24*      (2006.01)
    *H05H 1/42*      (2006.01)
    *C10J 3/18*      (2006.01)
    *C10J 3/48*      (2006.01)

(52) U.S. Cl.
    CPC ................ *C10B 19/00* (2013.01); *C10J 3/18* (2013.01); *C10J 3/487* (2013.01); *C10L 5/04* (2013.01); *C10L 5/442* (2013.01); *H05H 1/42* (2013.01); *B01J 2219/0809* (2013.01); *B01J 2219/0869* (2013.01); *B01J 2219/0879* (2013.01); *B01J 2219/0894* (2013.01); *C10J 2300/092* (2013.01); *C10J 2300/0906* (2013.01); *C10J 2300/0916* (2013.01); *C10J 2300/1238* (2013.01); *C10L 2200/0469* (2013.01); *C10L 2290/02* (2013.01); *C10L 2290/06* (2013.01); *C10L 2290/38* (2013.01); *Y02E 50/10* (2013.01); *Y02E 50/15* (2013.01); *Y02E 50/30* (2013.01)

(56) References Cited

U.S. PATENT DOCUMENTS

2009/0100752 A1    4/2009    Sessa
2010/0044483 A1    2/2010    Foret

Section AA

METHOD AND DEVICE FOR TREATING TWO-PHASE FRAGMENTED OR PULVERIZED MATERIAL BY NON-ISOTHERMAL REACTIVE PLASMA FLUX

This invention consists or a method of treating two-phase fragmented or pulverized material, that is to say comprising a stream of fluid (advantageously gas) carrying fragments in the solid or liquid phase, by a flow of non-isothermal reactive plasma at a pressure close to or higher than atmospheric pressure, and a device for the implementation of this method.

In the second half of the 20th century a great deal of effort was put into creating reactors enabling the treatment of streams of fluids carrying solid phase fragments. The most effective reactors are probably hydrodynamic reactors based on the cyclone principle, which enables high intensity thermal exchanges to be obtained in a turbulent flow regime in small volumes. The most efficient application is without doubt the Torbed© Reactor developed by Torftech Ltd. (Newbury, K) in 1998 (see www.torftech.com). This process is used in particular for the torrefaction of wood waste to make transportable effective fuels.

In theory, the only way of intensifying this process is to use a reactive flow in the form of a plasma. For this reason, plasma reactors have attracted considerable attention, in particular in connection with technologies for transforming materials by plasma chemistry and, in particular, with the combustion of organic matter, biomass recycling, the destruction and processing of products and waste and the production of chemicals.

The best known plasma processes and devices and the most widely used, especially in industry and in particular for plasma-assisted combustion and the destruction or transformation of biomass, domestic, medical, industrial and other waste, exploit the reactions in direct current, alternating current, high frequency, microwave-induced isothermal plasmas.

The term "isothermal" refers to plasmas in which the temperatures of the different components, in particular the heavy particles (molecules, atoms, radicals, ions) $T_1$, and the electrons, $T_e$, are practically equal. By definition, to plasma is isothermal when, at every point in its volume, this condition is met:

$$T_e = T_1$$

This is generally the case of the plasmas mentioned above. This means that the chemical reactions taking place in them are relationships of local thermodynamic equilibrium, described, for example, by the well-known Arrhenius equation. The concentration of the components of isothermal plasma is described by the equally well-known Saha equation.

The prior art has led users of plasma technologies, which they rightly consider as more effective than traditional methods of transforming, materials, to design reactors using isothermal plasmas (i.e. in a state of thermodynamic equilibrium) mainly at atmospheric pressure, such as direct current, alternating current, radio-frequency or microwave arc generators. The temperature of the plasmas created and used is of the order of 6000-15 000 K depending on the conditions of generation, it is clear that such plasmas are effective in destroying (decomposing) organic molecules. They are also effective in destroying non-organic molecules. Accompanied by a plasma quenching process (rapid cooling which prevents the recombination of many harmful molecular states, in particular dioxins and furans), these technologies have proven themselves to be advantageous compared to traditional thermochemical technologies (see for example, Khacef (A.), Cormier (J.-M.), Pouvesle (J.-M.), J. Phys. D: Appl. PHYS, 35, p. 1491-1498, 2002, Zhukov M. F. Is, S. O. A N USSR, Ser. Techn. Nauk, 1970, V2 (58) P 12-18; Burov I. S., Ermolaeva E. M., Mosse A. L., Minsk ITMO 1975, p. 71-78; see also www.europlasma.com).

Reactors with different geometries and shapes using one or more thermal plasmas in cyclones generated by high frequency or microwave current sources have been proposed in inventions belonging to FORET PLASMA LABS, LLC, The Woodlands, Tex. (US) (see for example U.S. Pat. No. 7,622,693 B2, priority date: 24 Nov. 2009 see also).

The company Yantai Longyan Power Technology Co Ltd has put a lot of effort into creating isothermal plasma burners (in thermodynamic equilibrium) for the combustion of coal dust in power plain boilers (see for example patent application No. 201 200 25 63 with priority date Feb. 2, 2012)

However, the high level temperatures characterizing isothermal plasmas (6 000-12 000 K) is superfluous. It is inevitable if we use an isothermal plasma, in particular at atmospheric pressure, as the level of temperature ($T=T_1=T_e$) determines the concentration of electrons necessary to the electrical conductivity of the plasma, the latter providing the energy balance of the electric arc and the resulting plasma jet. However, this level of temperature is excessive to achieve plasma-chemical reactions, which only require temperatures within the 1000 K to 3000 K range. The temperatures (6 000-12 000 K) involved lead to enormous energy expenditures and complex constructions that throw into doubt the very reasons for using isothermal plasma reactors.

In addition, obviously, the dimensions of the spaces in which thermal plasma can be confined, given its high temperature, are necessarily small, even in the case of the "FORET PLASMA LABS" invention referred to above. This very considerably reduces the contact surface of such a plasma with the media to be treated, making the reactions relatively inefficient and reducing their energy efficiency.

The necessary solution therefore is to use a non-isothermal plasma. Indeed, if the amplitude of the electric field that generates and accelerates the electrons in the plasma and causes the reactions of excitation and ionization in them is high enough, the plasma becomes non-isothermal, i.e.:

$$T_e > T_1 \tag{1}$$

For the relationship (1) to occur, the amplitude of the electric field E, according to Fridman (Plasma Chemistry Cambridge University Press 2008) E must fulfil a condition of the type (case of a weakly ionized plasma):

$$E > k \cdot T_1 \cdot n_e \cdot Q/e \tag{2}$$

in which
e is the charge of the electron (e=1.6 $10^{-19}$ C);
k is the Boltzmann constant (k=1.4 $10^{-19}$ J/K);
$T_1$ is the temperature of the heavy components (molecules, radicals, atoms, ions) in the plasma (K);
Q is the cross section of the elastic collisions between the electrons and the neutral components in the plasma ($m^2$);
$n_e$ is the concentration of free electrons ($m^{-3}$)
If, for example, $T_1 \sim 2000K$, $n_e \sim 10^{-19}$ $m^{-3}$, $Q \sim 10^{-18}$ $m^2$, we have $E > 10^4$ V/m.

In this case the temperature of the electrons may be determined by the relationship (see for example, H. Hingana. "Contribution à l'étude des propriétés des plasmas à deux temperatures" Doctoral thesis. Univ. Paul Sabatier, Toulouse, December 2010)

$$T_e \sim [e^4 m_e/n_e^2 m_1 k] \cdot [E/j] \quad (3)$$

in which
$m_e$ is the mass of the electrons (9.1 $10^{-31}$ kg)
$m_1$ is the (average) mass of the neutral heavy components in the plasma
j is the current density (A/m$^2$)

The practical use of a plasma in a non-isothermal state in a plasma reactor is technologically advantageous. Indeed, the electrons which, in this case, have a large kinetic energy, facilitate the formation of excited molecular states and radicals, which are extremely effective in destroying organic molecules or transforming molecules into reusable components.

In a non-isothermal plasma, the temperature level of the heavy components ($T_1$) may be of the order of 1000-3000K, which is high enough to achieve the desired chemical reactions without forming harmful chemical components, whilst the temperature of the electrons is generally of the order of 6000-15 000 K, which provides sufficient electric current to support the electric discharge mechanism and the energy balance of the plasma jet.

Non-isothermal plasma generators (see formulas (1) and (2)) have been proposed, protected by patents and used in industry (see for example, Engelsht V. S., Saichenko A. N., Okopnik G. M., Musin N. U. XI Vsesoyuznaya Konf. Po generatoram nizkotemperaturnoy plazmi, Novosibirsk, 1989; P 255; Desiatkov G. A., Enguelsht V. S., Saichenko A. N., Musin N. U., and al. Plasma jets in the Development of New Materials Technology. Proc. Of the international Workshop 3-9 September, Frunze, USSR Ed, O. P. Solonenko, A. I. Fedorchenko, V S P, Utrecht, (NL), Tokyo (Japan), pp 499-509; see also www.glidarc.com). They are based on the use of the principle of a high voltage axe gliding between two electrodes with a divergent to geometry Initiated by a discharge at the place where the electrodes are closest to each other, the arc is propelled along these electrodes thanks to the electromagnetic force created by the magnetic field due to the current passing through the electrodes and the current passing through the arc in a direction practically perpendicular to the axis of the electrodes. The movement of the arc may be also be spurred by the dynamic pressure of a longitudinal stream of propelling gas, which helps to form the jet of plasma downstream of the electrodes. As the arc glides, its length and electrical resistance increase and the intensity of the current decreases. There comes a moment when the current becomes too weak to support the energy balance of the discharge and the arc disappears. A new discharge is then initiated at the base of the electrodes and the process repeats itself. We therefore have a perpetual "to and fro" movement of the arc along the electrodes. As it moves the arc creates around itself a "plasma cloud" whose properties, and in particular the lifetime, depend on the nature of the gas in which the discharge takes place, the presence of a hydrodynamic flow of gas, the amplitude of the voltage between the electrodes, the frequency of the current generated between the electrodes, and the divergent geometry of the electrodes. This plasma cloud can guarantee the existence of an electricity conducting zone in the absence of electric current during its lifetime. It is therefore possible to supply the arc not only with direct current, but also alternating current, for example with a frequency of 50 Hz, as long as the duration of the plasma cloud is greater than the pause separating the voltage meanders between the electrodes.

Gliding arcs have been created using direct current and single-phase and three-phase alternating current generator at a frequency of 50 HZ. In the latter case, solutions with three electrodes and six electrodes have been proposed and implemented industrially. The use of three and six electrodes (see Engelsht V. S., Gurovich V. Ts., Desyatkov G. A., Musin N. U., Saitchenko A. N. Experimental investigation and application of the high-voltage low-current arc in gas flow. 20th ICPIG.-Barga, 1991-P. 978-979) is proposed with the aim of standardizing as far as possible the plasma zone generated in the reactor, given that this plasma is out of thermodynamic equilibrium and therefore contains large concentrations of molecules and radicals in a metastable state. It is the potential energy of these particles (nonthermal effects) and not only their kinetic energy (thermal effects) that enables the desired plasma-chemical reactions to be achieved.

An in-depth study of two-temperature nonthermal plasmas applied to gliding arcs, in particular at atmospheric pressure, can be found in the works of A. A. Fridman (see for example Plasma Chemistry Cambridge University Press 2008 pp 205).

However, the methods and devices mentioned, in particular in the publications of A. Fridman, have some disadvantages (instability, spatial nonuniformity, limited dimensions) which make them difficult to apply in practice and impossible to use in fragmented flow reactors which require, to treat a specific part of the fragments or their entire volume, an extended period of contact with the active plasma medium And an extended period of contact means an extremely large contact surface and therefore, above all, large jets of plasma used in the reactor and a geometric configuration able to develop the desired reactions.

The authors Desyatkov et al. have proposed a reactor configuration that fixes the position of the are in the space as soon as it reaches the ends of the electrodes. The current lines then curve, as they are subject on the one hand to the drag force of the flow of propelling gas and to the electromagnetic force and, on the other hand, to the hydrodynamic resistance of the arc which tends to keep its position in the most ionized area of the space.

However, the plasma used remains unstable. This instability is mainly due to the turbulent nature of the flow of propelling gas. The dimensions of the plasma jet are reduced and do not allow fragmented flows as defined above to be treated.

The invention of P. Koulik, A. Saychenko, METHOD AND DEVICE FOR GENERATING A NON-ISOTHERMAL PLASMA JET (patent FR10/01928, PCT/FR 2011/000277 (WO 2011/138525 A1), priority date May 5, 2010) partly solves the problem, allowing the volume of the plasma generated and its contact surface with the medium treated to be increased. However, the solution proposed, the "laminarization" of the process of generating the plasma jet is not sufficient.

In the context of foregoing, one aim of this invention is to develop a plasma reactor with a larger contact surface than in existing reactors. This aim can only be achieved by generating, and using one (or more) jet(s) of stable non-isothermal plasma, at a pressure close to or higher than atmospheric pressure, pressures higher than atmospheric pressure being useful, and even indispensable for working in dense environments such as plasma-chemical reactors for example, and in particular those used to transform biomass or the combustion chambers of gas turbines, etc.

It is advantageous to use such a reactor for the industrial performance of plasma-chemical reactions between solid fragments or the particles resulting from pulverization, carried by a fluid flow and an extensive active plasma zone in the space of a plasma-chemical reactor of limited size.

It is also advantageous to use a generation process able to create in the reactor an extensive area of non-isothermal plasma, quasi-stable over time, throughout the duration of the intended plasma-chemical treatment. The term quasi-stable means that the average parameters of the plasma are practically constant over time over periods longer than the generation period of the electric current, but substantially variable over periods of time shorter than the generation period of the electric current supplying the plasma. This means that in the non-isothermal plasma, the temperature of the heavy particles (molecules, radicals, atoms, ions) is relatively low (for example 1000K-3000 K), whilst the temperature of the electrons is substantially higher (OR 10 000 K-15 000 K). This plasma is especially advantageous in practice for pressures close to or higher than atmospheric pressure. It is clear that the higher the desired pressure, the more problematic the generation of such a plasma. In practice, it is possible to create such plasmas at pressures up to 100 bars with open-circuit voltages for example, de 10-30 kV. Such a plasma may be called "Plasma at intermediate temperatures" or PIT. This term is used by A. Fridman in particular (see for example Plasma Chemistry Cambridge University Press 2008)

We have adopted this name PIT, as defined above, in this invention.

It is advantageous to use a reactor using one or more jets of plasma of an elongated shape and whose length to diameter ratio is substantially greater than the unit and which can be formed into spirals.

It is all the more advantageous to use to this effect a reactor using one or more jets of non-isothermal plasma generated in such a way as to increase the length whilst limiting the energy exchanges with the surrounding gaseous medium consisting of fluids and fragments. In particular, it is advantageous to three the plasma jet to propagate along spirals coaxial to the reactor.

It is advantageous, whilst exploiting the laminarity properties of the plasma at the moment and in the place where it is generated, for example using as PIT generator as claimed in the invention of P. Koulik, A. Saychenko, METHOD AND DEVICE FOR GENERATING A NON-ISOTHERMAL PLASMA JET (patent FR10/01928, PCT/FR 2011/000277 (WO 2011/138525 A1), priority date May 5, 2010) to cause turbulence in the plasma jet so as to intensify the thermal and energy exchanges between the particles in the plasma and those in the reactive medium in which the plasma propagates.

To optimize the parameters of the plasma jet (heavy particle temperatures, electron temperature, plasma jet dimensions, flow rate of the plasma forming product, degree of turbulence), and, in particular, to form it into spirals in the reactor, it is advantageous to use a bipolar pulse supply current source generated at high frequencies (for example between 1 kHz and 100 Mhz) with pulse durations, for example, of between 1 and 1000 ms, pauses between the pulses of between 1 and 1000 ms, an open-circuit voltage amplitude, for example, of between 0.1 and 30 kV and an electric current amplitude, for example, of between 0.1 and 30 A.

A great advantage is any technology capable of providing a controlled treatment variable according to the composition of the feed gas, the material of the fragments or particles resulting from the pulverization, the form, the nature and the composition of the product treated, as well as the size of the fragments or pulverized particles.

Other aims, features and advantages of this invention are shown in the drawings, diagrams and illustrations enclosed with this invention, in which:

FIG. 2a is a longitudinal section of a reactor using a single plasma jet generator and FIG. 2b is a radial section of the reactor using two generators of non-isothermal plasma.

The principle of the process lies in what follows:

It is proposed to use as the basis a process for generating, a jet of non-isothermal plasma jet using a high voltage electric discharge in two-phase alternating current in a flow of gas, the discharge being initiated by a breakdown plasma, propelled by an electromagnetic force and by the drag three exerted on the electric discharge by a flow of gas and located at the ends of electrodes. This process is similar to the process described in the invention of P. Koulik, A. Saychenko, METHOD AND DEVICE FOR GENERATING A NON-ISOTHERMAL PLASMA JET (patent FR 10/01928). The configuration proposed in that invention, however, does not provide the necessary contact between the jet of plasma so that the desired reaction between the two is achievable and optimal.

Optimizing the process by increasing the temperature and the speed of the reactive flow is of little use because, from a certain intensity in the flow of heat, the material resists the treatment following ablation, a hydrodynamic phenomenon well-known, for example, for its use for the thermal protection of space vessels as they enter the dense layers of the Earth's atmosphere.

It is therefore imperative to find a way of increasing the size of the contact surface between the flow of plasma and the material treated. This can only be done by optimizing plasma generation process in the largest possible volume whilst concentrating the zone where the plasma is formed in the smallest possible volume.

The plasma in such a jet is in a nonthermal state (PIT) as defined by formulas (1)-(3), which gives this invention some advantages in principle, This invention allows the exploitation of these advantages based on the optimization of the use of the excited states of the particles in the plasma and those in the medium in contact with the plasma.

The plasma is generated by the passage of the electric current (non-stationary) in the stream of gas that surrounds the electrodes between which a large potential difference is established (for example, ~10-100 kV). As soon as the intensity of the current increases, the electric field weakens, given that the temperature, and therefore the electrical conductivity, begin to rise. This stage corresponds to the forming in the nascent plasma of a large number of molecules and radicals excited by the electrons, accelerated in the electric field. If the voltage is maintained, the electric current will quickly increase, the plasma will heat up and reach the thermal state. The idea of the invention, to generate the plasma jet necessary to the creation of the reactor claimed, consists:

1) of letting the current increase so as to accumulate an energy density sufficient for the plasma-chemical reactions to take place as intended (in this sequence, the temperature of the electrons $T_e$ is as determined by relationship (3);
2) of breaking off the current before the plasma heats up and reaches the thermal state. In practice, this corresponds to break current limitation values of between 3 and 30 A;
3) this break lasts for a length of time that is less than the relaxation time t. The plasma continues to exist during this period. The excited particles and the radicals created remain active and lose their activation energy in their interactions with the material to be treated. On the other hand, as soon as the electric current is broken off, the temperature of the plasma and its electrical conductivity decrease.
4) To maintain this metastable state, the process described in points 1)-3), has to be repeated, that is to say a new electric current pulse must be sent before the medium becomes non-electrically conductive again.

This amounts to supplying the electric discharge between the electrodes with current pulses. The parameters of these pulses are:
the amplitudes I and U of the current and the voltage respectively;
the frequency of generation $v_1=1/\tau_1$ (this generation can advantageously be done in the form of high frequency bipolar sine waves);
the duration of a pulse $\tau_2=\Psi/U.I.$ where $\Psi$ is the quantity of energy contained in the plasma jet (typically, $\Psi\sim10^3$ J)
the frequency of the pulses $v_3 1/\tau_3$ where $\tau_3\leq\tau=kT_1/P\sigma_i$
in which
$\sigma_i$ is the cross section of the inelastic interactions of the electrons with the particles in the plasma ($\sigma_i\sim10^{-20}$ m$^2$, (see for example B. Smirnov "Plasma Processes and Plasma kinetics" Wiley-VCH Verlag GmbH 2Co KGaA. 2007));
P is the pressure (P~$10^5$ Pa);
k is the Boltzmann constant (k=1.38 $10^{-23}$ J/K)
$T_1$ is the average temperature of the heavy particles in the plasma $T_1\sim 2\ 10^3$K).

Generally speaking, the process claimed in this invention is characterized in that the jets of PIT nonthermal plasma at intermediate temperatures, propelled into their helical movement, are supplied by bipolar pulse alternating voltage and current, each pulse consisting of a wave packet with respective amplitudes U, for example between 0.1 and 100 kV, and I, for example between 0.1 and 30 A, generated at a frequency $v_1$ for example between 50 Hz and 100 MHz, the values U, I, and $v_1$ being sufficient to initiate the plasma by a short-circuit spark, and whose duration $\sigma 2$, for example between 1 and 1000 ms, is long enough to reach a given temperature $T_1$ within the margins $1000 \leq T_1 \leq 6000$ K and lower than the temperature of the isothermal stationary plasma (in thermodynamic equilibrium) generated at the frequency $v_1$, the pulses being repeated at interlapses $\tau 3$, for example between 1 and 1000 ms, shorter than the plasma relaxation time, the latter being equal to the maximum duration of the recombination of the electrons with the ions generated in the plasma, the characteristic, pulse generation times being subject to the relationships:

$\tau_1(=1/v_1)$ this generation being able to be achieved advantageously in the form of bipolar waves at low or high frequency, sinusoidal, square, sawtooth, etc.;

$\tau_2=\Psi/U.I.$ in which $\Psi=n_{pl}(kT_1)W_{pl}$ is the quantity of energy contained in the jet or plasma with a volume $W_{pl}$ and a molecular density $n_{pl}$ (typically, at atmospheric pressure, $\Psi\sim10^3$ J)

$\tau_3 \leq \tau \sim (kT_1)^{-1.5}(m)^{0.5}P\sigma_p.$ in which
$\sigma_p$ is the average recombination cross section of the electrons with the ions in the plasma ($\sigma_p\sim10^{-20}$ m$^2$) (see for example, B. Smirnov, "Plasma Processes and Plasma kinetics" Wiley-VCH Verlag GmbH 2Co KGaA 2007);
P is the pressure (P$\geq 10^5$ Pa),
k is the Boltzmann constant (k=1.38 $10^{-23}$ J/K)
$T_1$ is the average temperature of the heavy particles in the plasma (T~2 $10^3$K),
this mode of supply being achievable, in particular when $v1=50$ Hz, $\tau 1=\tau_2 \propto \tau 3=0.02$ s.

FIG. 1 illustrates the nature of the discharge supply pulses.

Experience has shown that for example for air, the optimal parameters for generating pulses are of the order of:
$\tau_1\sim 10^{-7}$ s($v_1\sim 13$ MHz)
$\tau_2\sim 3.10^{-2}$ s
$\tau_3\leq\tau\sim 2.10^{-2}$ s We see that the network frequencies ($\tau_2\sim\tau_3\sim 10^{-2}$ s) used in the invention of P. Koulik, A. Saychenko, METHOD AND DEVICE FOR GENERATING A NON-ISOTHERMAL PLASMA JET, (patent FR 10/01928), although already satisfactory, can be optimized given the conditions of this invention: the length of the plasma jet obtained by applying the invention mentioned is ~1.5 for a generation power of ~100 kW whereas the length of the plasma jet that can be achieved by applying this invention can reach 3 m and more. The diameter of the area of plasma formed can reach 0.2-0.3 m.

The idea of supplying the plasma generator with pulses as described in this invention makes it possible to obtain a large plasma area (as mentioned above), sufficient to make it possible to impose on the flow of plasma, on the one hand, and on the gas stream carrying the fragments of material to be treated or the pulverized elements, on the other hand, coaxial helical trajectories at angles α and β respectively, relative to the plane perpendicular to the axis of the cylindrical or conical reactor, which makes it possible to efficiently perform nee, high intensity plasma-chemical reactions (given the use of a nonthermal plasma with a very high energy density) and, at the same time, to make the reactor more compact and therefore to substantially improve its energy efficiency, in particular by reducing the heat losses.

The angles mentioned must be chosen based on the following relationships:

Angle α is must satisfy the relationship:

$$\alpha = \arcsin(Y/j\Lambda) \quad (4)$$

in which $$\Lambda < k_p (U \cdot I)^{0.3} D_e^{0.2} V_s^{0.3} \quad (5)$$

In these formulas (see FIG. 2)
Y is the length of the reactor (m).
Λ is the length of the plasma jet produced by the plasmatron along the helical trajectory (m):
j is the number of plasmatrons operating in parallel;
U is the amplitude of the voltage applied between the electrodes in the plasmatron (V);
I is the amplitude of the intensity of the current passing between two electrodes (A);
$D_e$ is the diameter of the spiral along which the plasma (m) travels;
$V_s$ is the speed of the plasmatron feed gas (m/s).
$k_p$ is an empirical coefficient ($k_p \sim 6.31 \; 10^{-2} \; m^{0.3} J^{-0.3} s^{0.3}$)

The maximum angle β must meet the conditions expressed by the relationship:

$$\beta = \arcsin(U \cdot c \cdot \delta \cdot \Delta T_f / i \cdot Y \cdot Q_p) \quad (6)$$

in which
U is the speed of the incoming stream of fragments (m/s);
c is the heat capacity of the material of the fragments to be treated or the pulverized elements (J/m³ degree);
δ is the depth of treatment of the fragment of material of the pulverized element (m)
$\Delta T_f$ is the increase in temperature of the fraction(δ) of the fragment treated
i is the number of jets of flow laden with fragments introduced simultaneously into the reactor (degrees):
$Q_p$ is the density of the flow of energy transferred by the plasma to the fragment treated (W/m²)

$$Q_p \sim (1/3)(kT)^{0.5} m^{-0.5} E/1 \cdot \sigma \quad (7)$$

in which
k is the Boltzmann constant (1.38 $10^{-23}$ J/K);
T is the average temperature of the plasma (K);
m is the average molecular mass of the plasma particles (kg);
E is the average quantity of energy provided by the particles in the plasma (in practice, E~1 eV=1.6 $10^{-19}$ J);
l is the average size of the fragments or pulverized elements (m)
σ is the diffusion cross section of the plasma particles (for the air, σ~$10^{-19}$ m²).

In practice, in many cases, we have $$Q_p \sim 3.75 \; 10^2 \mu^{-0.5}/l \quad (8)$$

in which μ is the average molar mass of the plasma particles (kg/mole);

Relationships (4) and (5) express the condition according to which the length of the plasma jet corresponding to the generation parameters of the plasma jet is contained at least in the reactor with the length Y.

Relationships (6-8) express the condition according to which the time the fragment of material to be treated spends in the reactor is at least equal to the time necessary for the energy coming from the plasma and necessary to the intended reaction to be transmitted to the fragment (to the pulverized element).

The movement of the plasma and the fragments (the pulverized elements) to be treated in helical coaxial trajectories at angles α and β, independent of each other and in principle different to each other, makes it possible, on the one hand, to minimize the dimensions of reactor (in particular its length) and on the other hand to intensify the energy exchanges between the plasma and the stream of fragments (pulverized elements) to be treated.

Practical experience has shown that the movement of the plasma along a helical trajectory is possible and that, if the speed $V_s$ of the flow carrying along the plasma is greater than 1 m/s, there are practically no short circuits between the consecutive turns of this trajectory for voltages between the electrodes of up to 30 kV. This is explained by the fact that the electrical conductivity of the helical channel formed by the discharge remains high during the pauses between the electric pulses in the plasma relaxation conditions imposed in this invention, and in any case much higher than the electric conductivity of the peripheral areas around the helical channel where the plasma is concentrated.

According to formulas (4) and (5), we see that the angle α is all the smaller, the greater the power of the plasmatron, the speed of the gas introduced into the plasmatron and the diameter of the cylinder containing the electrodes.

According to formulas (6)-(8), we see that angle β is all the bigger, the smaller the dimension l of the fragment and the greater the energy exchange with the plasma.

In particular, for the treatment of fine dust carried in a powerful gas stream, as for example in the ease of the treatment of coal, lignite or peat dust in a boiler burner, angle β becomes equal to 90°. If in addition, the power of the plasmatron is high, we will have α~β~90°. In this case the reactor according to this invention becomes a device where the plasma jet and the jet of gas carrying the fragments (the grains of dust, the pulverized elements) are coaxial and no cyclone is needed, the two jets becoming co-linear (see FIG. 5).

Figure 6:
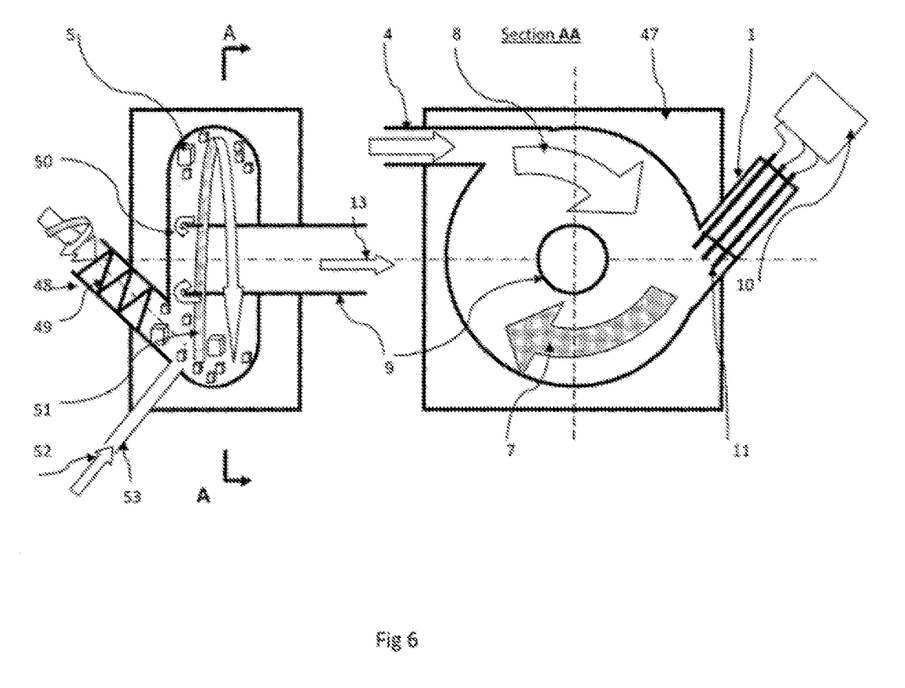
FIG. 6 is a diagram of a reactor in the particular extreme case where $\alpha \sim \beta \sim 0°$, which illustrates, for example, an application where biomass is transformed into a combustible product.

In another particular case where the treatment of large fragments is performed with a relatively low-power plasmatron, which requires extended contact of the fragments treated with the flow of plasma, angles α and β become close to 0° and the reactor according to this invention becomes a plasma cyclone as shown in FIG. 6. Such a cyclone is advantageous for treating biomasses and transforming them into intermediate fuel such as, for example, torrefied wood, or into biogases such as syngas for example.

Generally speaking, to sum up, we can see that the aims of this invention are achieved thanks to the generation of a jet of non-isothermal plasma, at a pressure close to or higher than atmospheric pressure, according to a process for treating fragmented material or pulverized elements in a reactor, which may for example be cylindrical or conical in shape, achieved by a rotational reactive flow and a flow of support gas laden with the fragmented material or pulverized elements set in helical movement coaxial to the reactor. Characterized in that the rotational flow consists of one or more continuous jet(s) (j) of nonthermal reactive plasma, quasi-stable, at so-called intermediate temperatures (PIT), produced by PIT plasmatrons supplied by alternating current and operating at a pressure equal to or higher than atmospheric pressure, PIT plasma travelling in a turbulent movement along a helical trajectory or trajectories with a diameter De at an angle α relative to the plane perpendicular to the axis of symmetry of the reactor and in that the flow of fragmented material is propelled by one or more jets (i) of support gas according to a helical trajectory with a diameter D at an angle β relative to the plane perpendicular to the axis of symmetry of the reactor, angles α and β being chosen according to the flow rate of the incoming fragmented material or pulverized elements, G, the speeds of the propellant U, the speed of the plasma jet(s). Vs, the average characteristic dimension of the incoming fragments of material, l, the length of the reaction zone Y, under the conditions of fullness of the reactions:

$$\alpha(\pm 10\%) = \text{arc } \sin(Y/j\Lambda)$$

$$\beta(\pm 15\%) = \text{arc } \sin U \cdot c \cdot \delta \cdot \Delta Tf/iY \cdot Qp$$

in which
Λ is the length (expressed in m) of the jet(s) of nonthermal plasma (PIT) at intermediate temperatures, given by the empirical formula $\Lambda = kp(U\,I)^{0,3} De^{0,2} Vs^{0,3}$);
Qp is the density (expressed in W/m2) of energy flow imparted to the fragments by the plasma, given by the formula $$Qp = (1/3)(kT1)^{0,5} \cdot ml^{-0,5} \cdot E/I \cdot \sigma;$$

and in which
c is the specific heat capacity of the fragmented or pulverized material (J/m3·K)
δ is the depth of the treatment effected on the fragments of material (m);
ΔTf determines the temperature range e in which the treatment (K) takes place:
U and I are respectively the amplitude, average over time, of the voltage at the electrodes given by the plasma jet generator(s) (in V) and I is the amplitude, average over time, of the corresponding intensity of the current that passes through them (in A);
T1 is the average temperature of the heavy particles in the plasma (in practice 2000K);
Te is the temperature of the electrons in the plasma (PIT) at intermediate temperatures (K);
ml is the average mass of the heavy particles in the plasma (kg);
E (~kT1) is the quantity of plasma-chemical energy imparted to a fragment of material or to a pulverized element when it collides with a molecule I of the jet of nonthermal plasma at intermediate temperatures (J);
σ is the cross section in the particles of the plasma relative to the elastic collisions between them (in practice, $\sigma \sim 10^{-19}$ m$^2$);
k is the Boltzmann constant (k=1.38 10$^{-23}$ J/K);
kp is an empirical coefficient (kp~6.31 10−2 ml0.5 J−0.3 s0.3);

The performance of the tests carried out according to this invention has shown that the margins of tolerance (of accuracy) of angles α and β as estimated using relationships [3]-[7], established based on the performance of the tests conducted, are respectively (±10%) for α and (±15%) for β.

It should be noted that all the measures intended to intensify the energy exchanges, in particular between the plasma jet and the solid fragments to be treated, come up against the essential obstacle of the heat treatment of solid products: the increase in the temperature inside the object treated (the fragment) is subject to the physical laws of thermal conductivity: the progression of the "thermal wave" is determined by the relationship $$\Delta x = (\Delta \tau \lambda/\rho c)^{0.5}$$

in which
λ, ρ and c are respectively the thermal conductivity coefficient, the density and the heat capacity of the material
Δτ is the penetration time of the thermal wave
Δx is the penetration depth of the thermal wave.

We have, as a first approximation, Δx=λΔT/Q where Q is the density of heat transferred to the body treated. For a given process, ΔT is fixed. The greater the intensity of the heat exchange (Q), the smaller the penetration depth. To overcome this effect, it is necessary, during the treatment, to eliminate as the treatment progresses (for example mechanically) the layers of product already treated. One of the possibilities is to organize the treatment of the fragments so that they collide with each other during the treatment and the outer layers crumble and come away from the body that has not yet been treated. The addition of sharp protuberances on the reactor walls could be effective. Another solution is to organize the treatment in such a way that the fragments are treated quickly (Δτ) in the reactor then conveyed to a crusher that breaks and separates the fragments from the treated outer crust and are then returned to the reactor. In this case, the crusher is integrated in the reactor claimed in this invention. It is possible in this way to substantially increase the rate of treatment.

For example, in the case of the production of torrefied wood dust, the estimations and preliminary tests have shown that the speed of the treatment of wood waste in a reactor as claimed in this invention, can be increased 100-fold compared to the rate of production by a thermal process in a device of the "Torbed©" type (see www.torftech.com).

It should be noted that this invention allows the selection of the products created in the reactor claimed. In particular, the invention makes it possible to produce treated fragments with a fixed maximum dimension $l_0$. This is possible by choosing the diameter d of the treated product evacuation duct.

Device according to the previous claims, characterized in that the outlet duct (9) for the products created in the reactor is built so that its interior diameter d is limited according to claim 3 according to the diameter D of the spirals (8) formed by the flow of carrier gas laden with fragments or pulverized elements (5), angle β defined according to claim 1, the required $l_0$ of the particles to be produced in the reactor and densities $\rho_c$ and $\rho_g$ of the material of the fragments or pulverized elements treated and the carrier gas, according to the formula $$d \leq [4D^2 l_0/(tg\beta)^2 (\rho_g/\rho_c)]^{1/3}.$$

This choice is made based on the relationship $$l_0 > (tg\beta)^2 (\rho_g/\rho_c) d^3/4D^2 \qquad (9)$$

in which
$\rho_g$ and $\rho_c$ are respectively the densities of the gas phase and the solid phase of the flow entering the outlet duct;
D is the diameter of the first turn in the stream of fragmented material (see FIG. 2)

The relationship (9) is obtained based on the condition of equality of the centrifugal force acting on the outgoing particle after its circular movement, this force increasing as the particle with dimension l comes closer in its circular movement to the axis of the reactor, with the hydrodynamic resistance force of the particle carried by the flow of gas rushing into the reactor's outlet duct. It is important to note that the site of the outgoing particles l depends on angle β and therefore the parameters of the reactor claimed in this invention as relationships (6)-(8) show.

To sum up, this invention claims a device characterized in that the outlet duct (9) for the products created in the reactor is built so that its interior diameter d is limited according to the diameter D of the spirals (8) formed by the stream of carrier gas laden with fragments or pulverized elements (5), angle β, the required size 10 of the particles to be produced in the reactor and densities $\rho_c$ and $\rho_g$ of the material of the fragments or pulverized elements treated and the carrier gas, according to the formula $$d \leq [4D^2 l_0/(tg\beta)^2 (\rho_g/\rho_e)]^{1/3}.$$

Figure 1A:
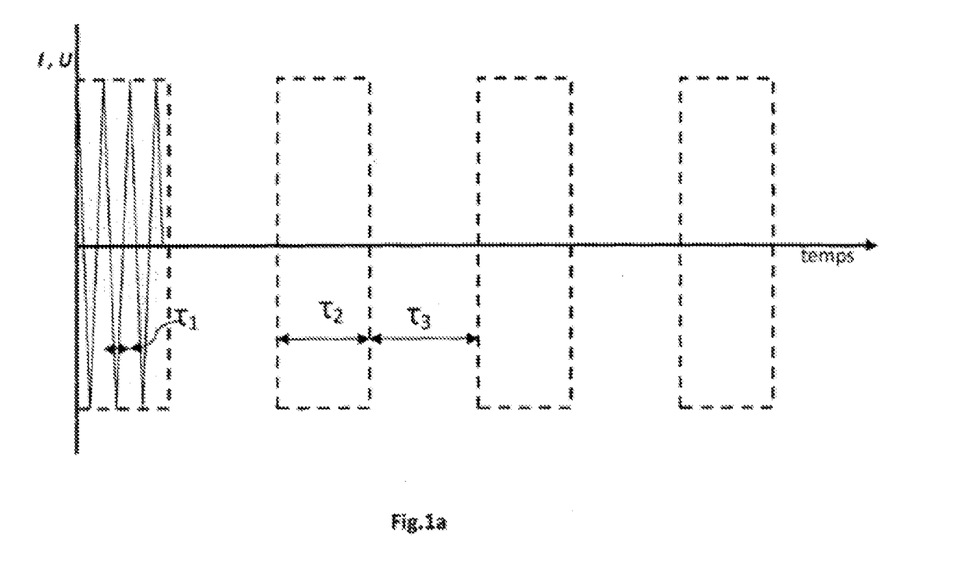
FIG. 1 is a diagram showing how the electricity is supplied to the plasmatron as claimed in this invention, with the inductors limiting the electric current in the plasma placed in either the primary or the secondary winding of the plasma generation transformer.

The way the plasma generator claimed in this invention is supplied is illustrated in FIG. 1. Generally speaking, as FIG. 1a shows, it is supplied by packets of pulses with an electric current with an amplitude I, and with a voltage with an amplitude U. The current is generated b high frequency bipolar waves $v_1 = 1/\tau_1$, in particular of sinusoidal form. Wave packets are formed. Their duration is $\tau_2$. This duration is chosen so that the amplitude of the electric current does not exceed a current intensity value I corresponding to a temperature, and therefore a given electrical conductivity of the PIT plasma. In practice, $$3 < I < 30 A,$$

which corresponds to the empirical recommendation $\tau_2 = \Psi/U.I.$ where $\Psi$ is the quantity of energy contained in the volume of the plasma jet, that is to say the product of the enthalpy required by the volume of the plasma. Typically, $\Psi \sim 10^3$ J The interlapse $\tau_3$ between the pulses is at the most equal to the plasma relaxation time as explained above in the paragraph of the description of this invention containing the analysis of the parameters of the electric pulses.

Figure 1B:
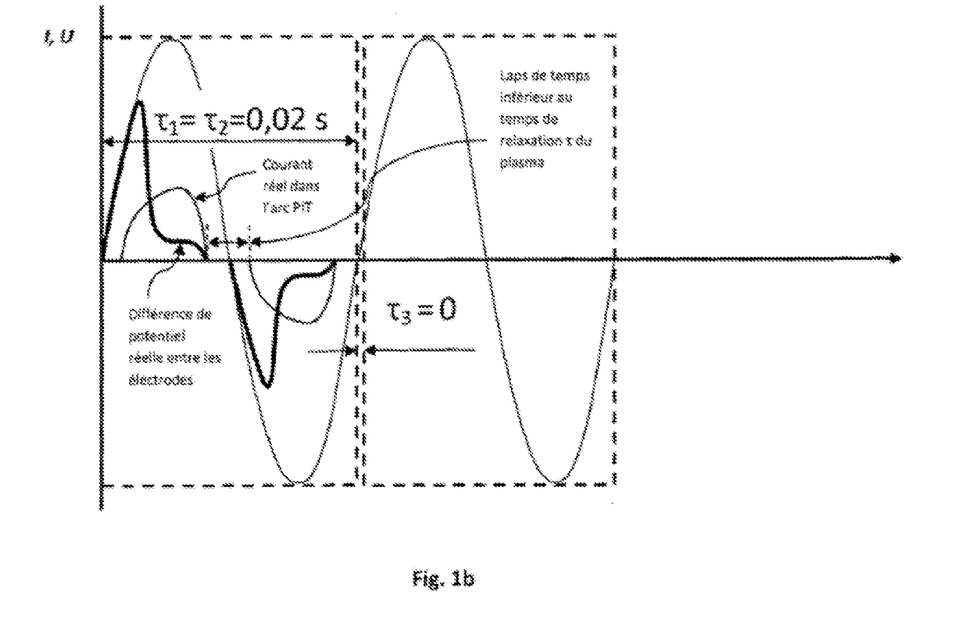

FIG. 1b illustrates, by way of an example, a particular case of a method of supplying PIT plasma with traditional alternating current at a frequency of 50 Hz. In this case, $\tau1 = \tau2 = 0.02$ s, and $\tau3 = 0$. This method of generation, used in particular in the invention of P. Koulik, A. Saychenko METHOD AND DEVICE FOR GENERATING A NON-ISOTHERMAL PLASMA JET (patent FR10/01928, PCT/FR 2011/000277 (WO 2011/138525 A1), priority date May 5, 2010) is applicable and very easy to implement in practice with a current source consisting of a step-up transformer and a system of inductors limiting the current in the primary or secondary circuit (FIG. 1 shows the particular case of the use of inductors in the secondary circuit) to which the electrodes are connected. However, if we refer to the conditions described above, this method of generation is not optimal for obtaining the appropriate and desired parameters of the PIT plasma. The conditions put forward in this invention enable this method of supply to be optimized and therefore a new plasma medium to be created, advantageous for the achievement of the aims of the invention.

The device for implementing the process of treating fragmented material by a reactive plasma flow at atmospheric pressure as defined in this invention is illustrated in FIG. 2.

Figure 2A:
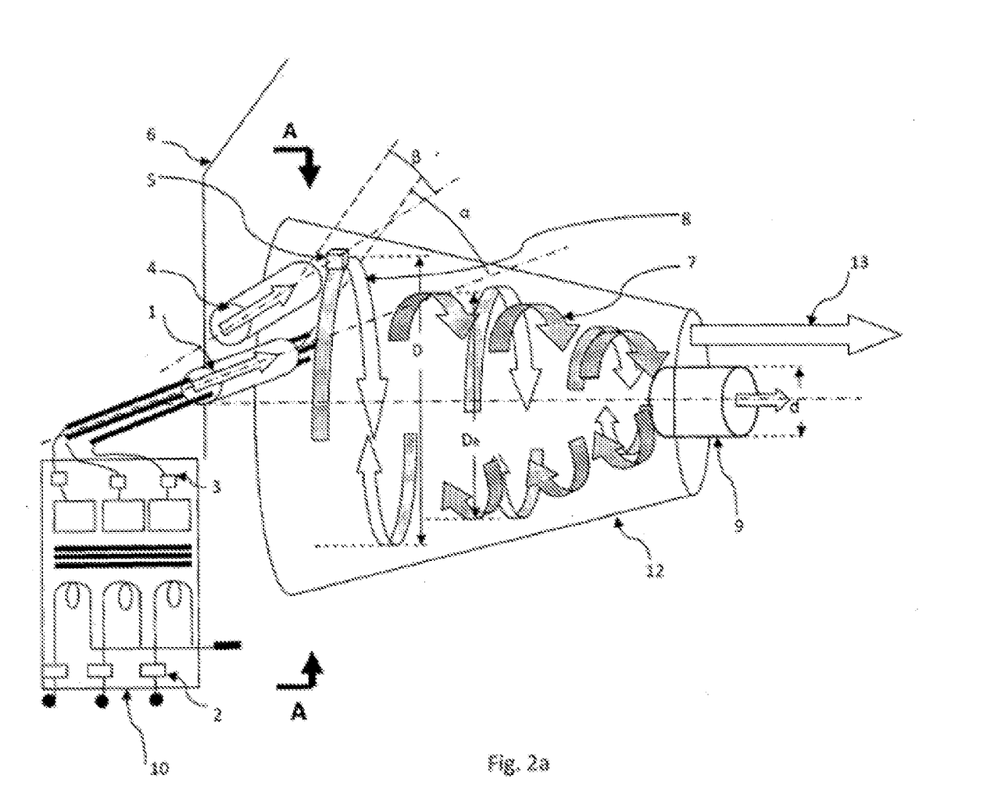
FIGS. 2a and 2b the construction of a conical reactor using a fragmented flow jet at an angle β relative to the plane perpendicular to the axis of the reactor and a flow of non-isothermal plasma at an angle αrelative to the plane perpendicular to the axis of the reactor, with the plasma created by a high voltage arc generator between three electrodes in an alternating current regime consisting of bipolar pulses at a limited current and at a controlled variable frequency. Specifically.

As FIG. 2a shows the central part of the reactor is the PIT plasma generator (1) generating a jet of nonthermal plasma at intermediate temperature which is the result of a high voltage pulsed electric discharge as shown in FIG. 1. This device is characterized in that it is generated by voltage and current pulses of controllable, given amplitudes U and I, organized in packets of high frequency bipolar waves of sinusoidal, sawtooth, square or other form, whose duration and frequency are set so as to maintain the discharge in a non-stationary state creating a plasma state out of thermodynamic equilibrium. This organization is implemented in the pulse generating device (10) supplied, for example, by three-phase alternating current from the mains passing through a step-up transformer. The presence in this device of means of limiting the amplitude of the electric current (for example ballast inductors placed in the primary (2) or secondary (2') circuit of the generator transformer), the repetition frequency of the pulse packets and the repetition time of these packets (for example a system of thyristors (3)) enabling the level of temperatures $T_l$ and $T_e$ to be adjusted. The temperature of the heavy components $T_l$ in the plasma (molecules, radicals, atoms, ions) can therefore be varied, for example, between 1000 and 6000 K, and the temperature of the electrons, from 10 000 to 20 000 K. The temperatures variations in these diapasons therefore enable wide spectrum of plasma-chemical reactions to be carried out in the reactor.

It is also these measures that make it possible to have a very long jet of plasma (between 0.5 and 5 m for powers from 10 to 100 kW and gas speeds of between 1 and 10 m/s inclusive), the indispensable and exclusive condition for the implementation of this invention since the plasma can, in this case, be organized in the form of a swirl or cyclone with several turns (7) which offers a large volume of energy exchanges in particular with the flow of fragmented or pulverized matter (8) that has been treated in the reactor in question according to this invention. It is obvious that, following the exchanges between the two flows (7) and (8), these two flows mix at a certain distance from the places where they were formed.

Generation devices with two, three or six electrodes can be produced.

FIG. 2a illustrates the use of a generator with three electrodes (11). One, two or more plasma generators of this type can be installed in the wall of the reactor.

Figure 2B:
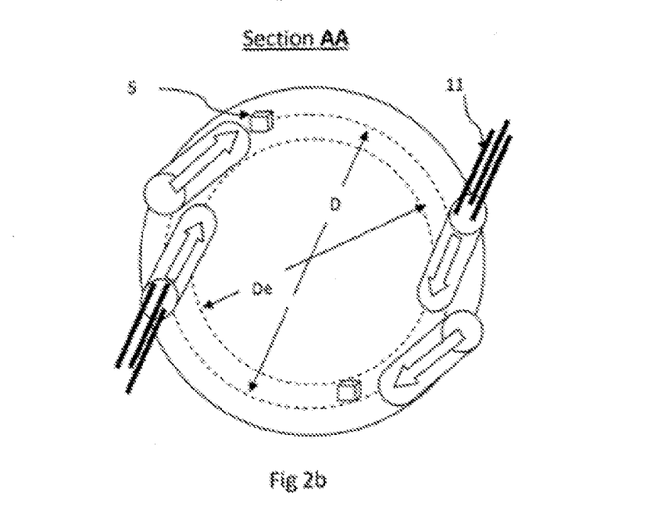

FIG. 2b, which is a cross section, AA, of the reactor as shown in FIG. 2a, illustrates the simultaneous use of two plasma generators.

In the case where a system of limiting the electric current in the PIT plasma constituted is used, for example with inductors (2') introduced in the secondary for each of the electrode circuits, this mode of supply can serve an unlimited number of plasmatrons.

As the diagram in FIG. 2a shows, the plasma generators 1 as well as the inlet ducts for the flow(s) of support gas 4 laden with fragments to be treated 5 are fixed on the reactor so as to respectively create angles α and β with the plane 6, perpendicular to the axis of the reactor according to relationships (4) (5) and (6)-(8) respectively, which enables the flows of plasma 7 and of fragmented material or pulverized elements 8 to be organized into at least two helical jets independent of each other, but which, at a certain distance from where they were formed, mix with each other. This geometry, as well as the choice of the dimensions D and $D_e$ and the speeds of the plasma movement $V_s$ and of the fragment movement U, enables the intensity of the heat exchanges and the fullness of the plasma-chemical reactions taking place in the reactor that is the subject of this invention to be optimized.

The diameter d of the outlet duct 9 is chosen so that the exit gas contains only solid particles smaller than a given size $l_0$ according to equation 9:

The reactor may be cone-shaped 12, as shown in FIG. 2a, or cylindrical.

The residual gases which may contain solid particles larger than $l_0$ leave the reactor via a duct 13.

The device shown in FIGS. 2a and 2b operates as follows: when the discharge is initiated in the plasmatron 1, supplied with electric pulses by a generator 10, pulses conditioned by devices limiting the amplitude of the electric current, for example inductors 2, and devices 3 forming bipolar electric current pulses, an arc of PIT plasma is stabilized by the electromagnetic forced and the drag of the stream of gas surrounding the electrodes 11 and enters the reactor at an angle α relative to the plane 6 perpendicular to the axis of the reactor following a helical trajectory with a diameter $D_e$. The PIT plasma jet 7 thus created is located along the turns of the helix as the electrical conductivity of the plasma zone is, at any time, far higher than the electrical conductivity of the adjacent areas. A jet of gas 8 laden with fragments or pulverized elements of material to be treated 5 is then injected into the reactor along a helical trajectory with diameter D which forms an angle β with the plane perpendicular to the axis of the reactor. The respective speeds $V_s$ and U of the flows are different, which contributes to creating intense energy exchanges between the flux. The angles α and β are chosen so that the plasma zones are entirely contained in the volume of the reactor and the expected plasma-chemical process takes places entirely during the movement of the fragments or pulverized elements along their helical trajectory inside the reactor. Conditions (5)-(8) are met. The hydrodynamic streams which occur and the diameter d of the conduit (9) where the parcels of residual matter are evacuated are organized and chosen so that, if necessary, only the residual particles smaller than a given size $l_0$ are evacuated via the conduit (9). The other, larger residue remains in the reactor until its treatment is compatible with the requirements for the outgoing product or it is removed via the ducts (13).

Figure 3:
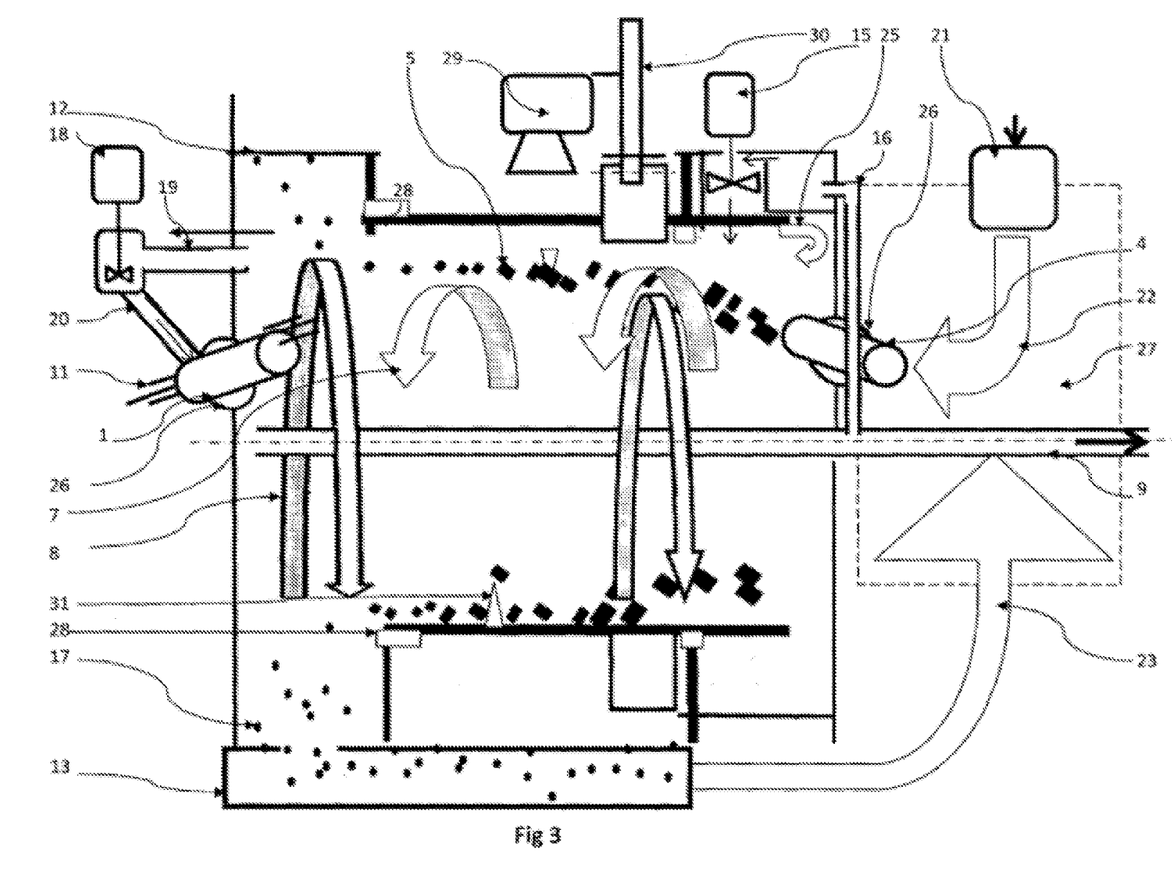
FIG. 3 shows the construction of a hermetic, cylindrical reactor enabling the implementation of this invention in the case where the flows of plasma and the flow of fragmented or pulverized products are directed towards each other and are used to produce fuel gas (hydrogen, syngas).

FIG. 3 shows a variant embodiment of this invention according to which the reactor, of cylindrical geometry, is a hermetic enclosure intended for the production of fuel products without coming into contact with any oxidizing atmosphere, in particular the ambient air. The product to be treated is introduced by the duct (4) into the reactor in the form of a gas laden with fragments of material or pulverized elements to be treated (5). The gas carrying the fragments (5) is introduced at an angle β between the axis of the duct (4) and the plane perpendicular to the axis of the reactor following a helical trajectory (7). The plasma, generated by the plasmatron (1) equipped with electrodes (11) is introduced at an angle α between the axis of the plasmatron (1) and the plane perpendicular to the axis of the reactor following a helical trajectory (8). FIG. 3 shows a variant of the reactor corresponding to the case where the two streams flow towards each other. The plasmatron (1) and the duct (4) are mounted on ball joints (26) which enable the angles of attack of the flow of plasma, α, and the jet of gas laden with fragments to be treated, β to be varied, adjusted, optimized and controlled. Under the effect of the centrifugal and hydrodynamic forces, the fragments to be treated propagate along the walls of the reactor. To accelerate the treatment process, these walls are provided with protuberances which may be sharp (31), intended to break up the fragments or free the frangible layer of product formed on their surface (for example in the case of the torrefaction of fragments of wood). To increase the centrifugal forces acting on the fragments treated, the peripheral wall of the reactor may take the form of a rotating drum, provided with a system of gears (30) and rotated by a motor (29). The drum is supported by sealed bearings (28). The plasmatron is supplied with gas by the fluid coming from the cavity of the reactor. By means of the ducts (19) and (20) and the compressor (or fan) (18).

The particles treated that meet the conditions (9) are evacuated via duct (9). The particles (17) that do not meet the conditions (9) are evacuated via manifold (12) and a receptacle (13) from where they are taken via a duct (23) to the inlet (27) for the stream of gas laden with the fragments or pulverized elements to be treated, where by means of the conduit (22) and fragment dosing apparatus (21) the initial stream of gas laden with fragments or pulverized elements to be treated is introduced.

A duct (16) is provided to take off a part of the gas generated in the reactor and send it by means of the fan (15) into the reactor in a swirling flow (25), which reinforces the cyclone motion of gas laden with fragments of material or pulverized elements to be treated. FIG. 3 shows only one plasmatron. In actual fact, an unlimited number of plasmatrons may be used, in order to create a large volume, high power, highly productive uniform reactive medium.

Figure 4:
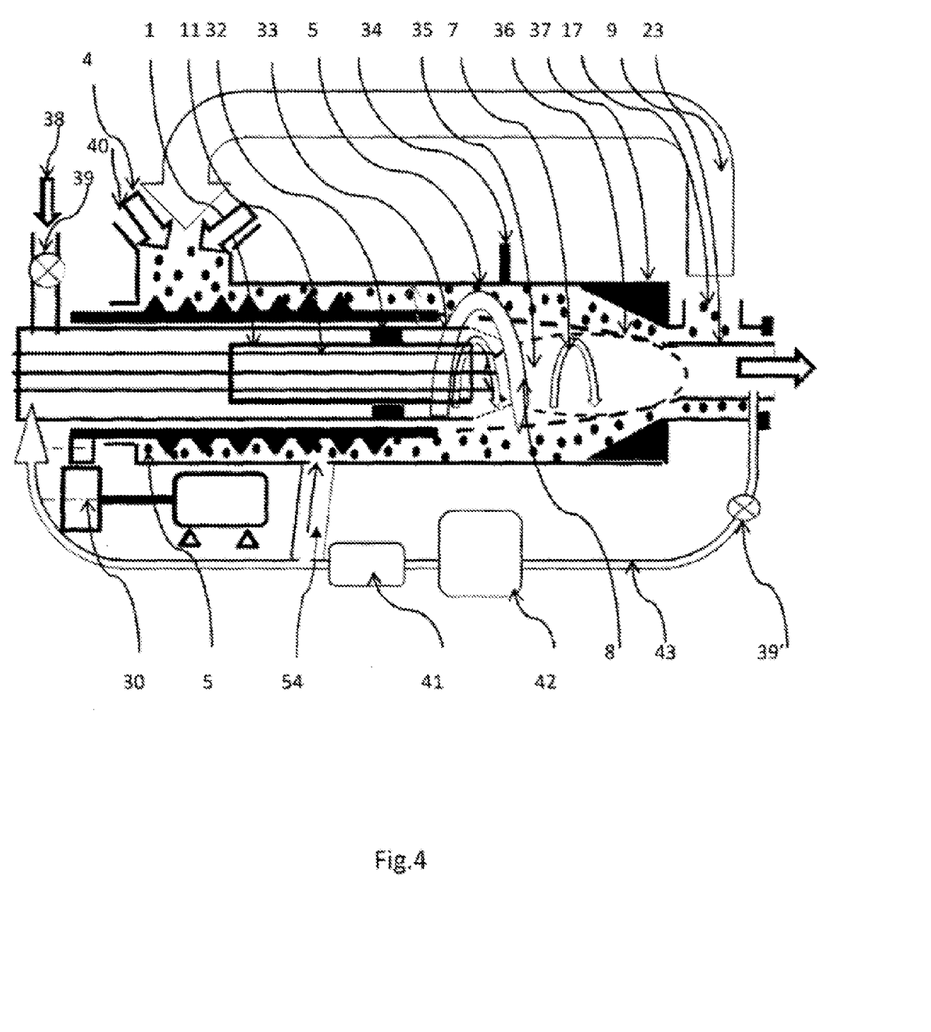
FIG. 4 shows the construction of a cylindrical, hermetic reactor for the production of biogas for example, in the case where the material to be treated is fragmented and propelled into the reactor by an endless screw and the surplus fragments of untreated material are returned to the reactor inlet.

FIG. 4 illustrates another embodiment of this invention in the case where the material to be treated is in the form of highly agglomerated or very large fragments 5. The product from the inlet duct 4 is introduced into the reactor by a hopper 40 and passes into in the reactor by means of a mechanism, for example, an endless screw driven by a motor and a system of gears 30. The fragments thus introduced in a rotational movement 8 are distributed, in a peripheral area 36 of the reactor. The plasma is generated by the plasmatron 1 provided with electrodes 11. It enters the reaction zone 35, carried along by a peripheral gas entering via the duct 33 which is caused to rotate by the presence of a (honeycomb) grille 32 placed in its path. When the reactor starts the peripheral gas (for example air 38) enters via the duct 39 which is fitted with as valve. When the reactor is operating normally, the valve 39 is closed and the reactor is supplied with gas produced in the reactor by a gas recovery system composing as duct 43, a flow control valve 39', a coolant 42 and a compressor 41. As shown in FIG. 4, a part of this gas is introduced directly into the reactor via duct 54.

The gas produced is evacuated via duct 23. The rest of the fragments 17 are taken via duct 9 back to the reactor inlet. A baffle 37 prevents remaining untreated fragments from building up in the reactor and forming blockages.

The reactor is fixed by a bracket 34.

In the case in question, according to the requirements of this invention, angle α varies between 20° and 60° whilst angle β is practically equal to 90° given the method of mechanical propulsion of the fragments of material to be treated used.

Another embodiment of this invention is realized and illustrated in FIG. 5. In this case the fragments to be treated or the pulverized elements 5 are very small in size, which means that angles α and β are practically equal to 90°. This is the case of boiler burners or combustion chambers for turbines or biomass transformation reactors, for example, where the stream of material to be treated is represented by a flow of air laden with coal, lignite or dried, ground peat dust, or charcoal dust or torrefied wood dust or simply fuel gas, etc. The reactor proposed in this invention for this case, is a PIT plasma burner which experience has shown to be advantageous compared to fuel or diesel oil or natural gas burners.

Figure 5A:
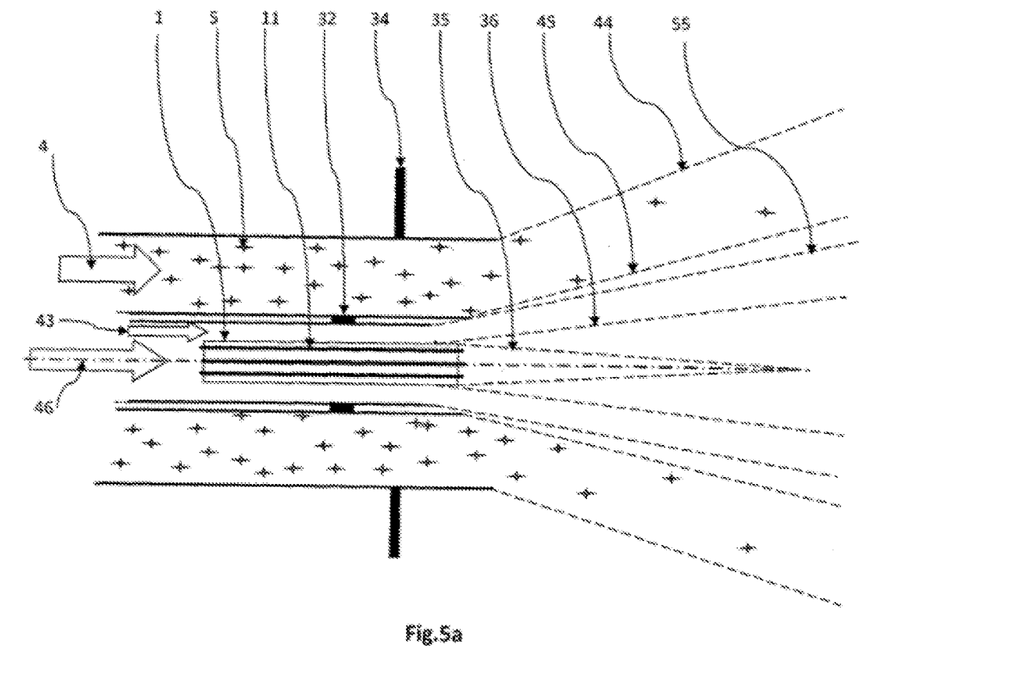
FIG. 5a is a diagram of a coaxial reactor in the particular extreme case where $\alpha=\beta=90°$, which illustrates, for example, the application of this invention to a PIT plasma-assisted boiler burner.

In FIG. 5a, the burner proposed is fixed into the wall of the boiler (combustion chamber, reactor) by means of the bracket 34. It consists essentially of a PIT plasmatron 1 provided with electrodes 11, as described for the applications in FIG. 2, FIG. 3 and FIG. 4. The fragments 5 are fed in by a stream of gas 4 in a cylindrical duct coaxial to the plasmatron 1 supplied by a flow, for example of air 46. Between the plasmatron channel and the inlet duct for the stream of gas laden, for example, with fuel dust, an intermediate duct is placed, supplied by a flow, for example of air 43, which passes through, for example, as honeycomb grille 32 designed to shape the velocity profile of the gas between the flow supplying the plasmatron and the flow of gas carrying the fuel dust in the area (36)-(55). This intermediate flow avoids a (sudden) turbulent mixing of the flow 4 and the plasma jet which would give off a combustion heat too intense and too concentrated given the catalytic properties of the PIT plasma jet. The grille 32 profiles the velocities of the intermediate flow so that the mixing takes place progressively and the combustion heat given off is spread through a large volume, of the boiler. The structure of plasma jet consists of an initial zone 35 and a mixing zone with the intermediate flow (35)-(36). The velocity profiles of the coaxial streams of gas are transformed in the zone (36)-(55). The dust only comes into contact with the active particles of the plasma in the intermediate flow zone (55)-(45). The combustion front of the dust in the air only develops in the extended zone (45)-(44) where the particles of fuel gradually disappear, transformed into $CO_2$ and $H_2O$.

The solution presented in FIG. 5a differs from existing solutions by the fact that the plasma develops in a large space, the plasma is in a highly excited state (PIT), which enables efficient combustion, for example in as large volume of the boiler, the heat losses are very low and the efficiency of the burner is close to 85-90%.

Figure 5B:
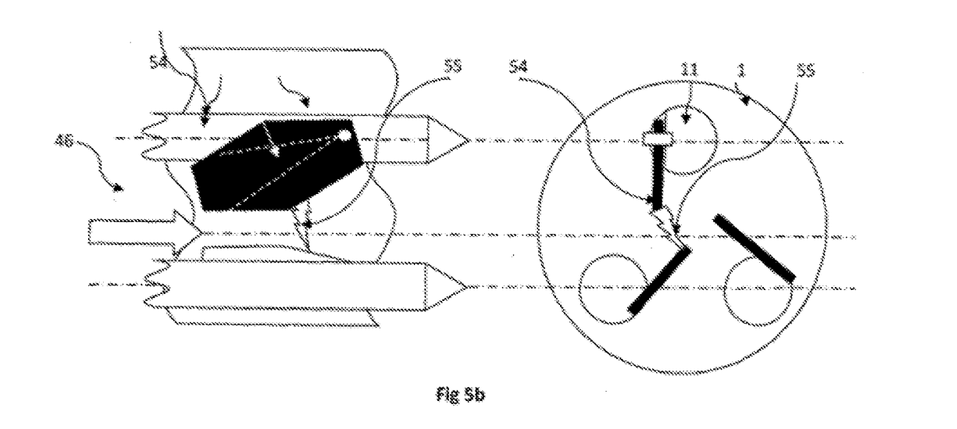
FIG. 5b shows the coaxial reactor of FIG. 5a in elevation.

This embodiment of this invention may be used when the bracket 34 fixes the plasmatron to the wall of a high pressure container. In this case, it is important to be able to ignite the high pressure PIT plasma jet. To this effect, as shown in FIG. 5b, the electrodes 11 of the PIT plasmatron are provided with adjustable pins 54 which enable the short-circuit distance 55 to be varied according to the level of pressure in the container.

FIG. 6 illustrates another extreme case of application of this invention. The fragments treated in this case are very large in size. This corresponds to the situation as proposed in this invention where angles α and β are both close to 0°.

The peripheral part of the reactor cavity 47 has the shape of as toroid. The fragments 5 are introduced tangentially into tin cavity, for example mechanically, via the duct 48 provided with an endless screw 49. The flow of material to be treated moves in the reactor cavity along as virtually circular path 51. The PIT type plasmatron(s) 1 with its (their) electrodes 11, as described in FIG. 2, FIG. 3 and FIG. 4, is (are) fixed in the body of the reactor so that the axis of the jet(s) of plasma generated 7 is tangential to the axis of the toroid. A jet of support gas 8 from duct 4 and as jet 53 of catalyst gas (for example water vapor 52), are also injected tangentially. In the case illustrated in FIG. 6, the four jets come together and mix in the toroidal cavity. The gas and the solid particles 13, produced under the conditions 9 of this invention, are evacuated via the outlet duct 9.

A device of this type, hermetically sealed with a closed cycle for the gases produced, can be used, for example, for the production of torrefied wood dust, which afterwards can be compressed into torrefied pellets ready to be transported to their place of use, for example for combustion in a boiler or in a gas turbine combustion chamber.

This device can operate at atmospheric pressure and at high pressure (<100 bars).

FIG. 5b illustrates a case using 3 electrodes. But the solution proposed is valid for a PIT plasmatron containing 2 or 6 electrodes.

EXAMPLES OF APPLICATIONS OF THIS INVENTION

Example 1

Air-based nonthermal plasma reactor applicable as a boiler burner in a power plant (see diagram FIG. 1)

Location of tests: Frunze (Bishkek, Khirghiztan) coal-fired power station;
Type of boiler: BKZ-160. 100 F
Air flow rate in the plasmatron: ~0.1 $m^3/s$
Air flow rate in the intermediate flow: ~0.3 $m^3/s$
Rate of air flow carrying fragments; ~1 $m^3/s$
Nature of the fragments: pulverized, coal dust.
Particle size: between 10 and 100 μm
Power: 50 kW
Pressure: 1 bar
Voltage at the electrodes: U=10 kV
Maximum electric current: 30 A
Frequency of the three-phase alternating current: 50 Hz
Number of electrodes: 6
Length of plasma jet: ~2 m
Stabilization device: honeycomb distributor
The plasma jet retains its properties thanks to the measures taken to stabilize it.
Maximum throughput of pulverized coal in the plasma burner: 1 tonne/h
Characteristics of the pulverized coal:
  HP=16.7 mJ/kg.
  Ash content: 35%;
  volatile content: 28-38%
Number of fuel oil burners on the boiler: 8 (2 stages of 4)
Number of plasma burners installed to replace the fuel oil burners: 2
Level of installation: second
Duration of tests: 10 days×8 hours
Test results:
  Total amount of fuel oil used without plasma burners: 500 kg/h
  Total amount of fuel oil used with plasma burners: 350 kg/h
  Saving 1 PIT burner provides a saving of 75 kg/h of fuel oil, or ~€70/h Example 2

Gas-based nonthermal plasma reactor of complex composition with a pressure equal to or higher than atmospheric pressure applicable for the production of torrefied wood powder.
Type of reactor: See diagram FIG. 6.
Hermetic construction.
Electric power: 100 kW
Amplitude of the voltage at the electrodes: U=10 kV
Current amplitude: 10 A
Frequencies and periods:
  $v_1$=13.6 MHz.
  $\tau_2$~3.10−2 s
  $\tau_3$~3.10−2 s
Number of electrodes: 6
Interior diameter of the reactor: 1 m
Diameter of cylinder containing the electrodes: 0.15 m
Diameter of circle tangent to the axis of the reactor: 0.8 m
Diameter of circle tangent to the admission axis of the fragments to be treated: 0.7 m
Diameter of circle tangent to the axis of the water vapor inlet channel: 0.9 m
Diameter d of the outlet tube (9) of the reactor: 16 mm
Nature of the fragments: Fir and pine wood waste in the form of crushed chips.
Characteristic dimensions of the fragments: between 0.01 and 0.1 m
Fragment throughput rate: 1 T/h
Rate of production of torrefied wood powder: 0.2 T/h Power consumed (mainly for the evaporation of the water contained, in the wood waste) ~90 kW
Thermal efficiency: ~0.9
Dimensions of the torrefied wood particles produced: between 0.005 and 0.02 mm
Dimensions of the fragments produced and selected in the outlet tube according to the calculation in formula [8] for the diameter 16 mm: 0.01 mm (protuberances in the form of metal spikes 3 mm are arranged in the wall of the Reactor. A crusher is installed in the treated fragments return channel);

Example 3

PIT plasma reactor for transforming wood waste into syngas.
Type of reactor: See diagram FIG. 3.
Hermetic construction.
Electric power: 90 kW
Pressure: 1.1 bar.
Amplitude of the voltage at the electrodes: U=12 kV
Current amplitude: 5 A
Characteristic frequencies and periods according to this invention;
$v_1$=13.6 MHz
$\tau_2$=2.10$^{-2}$ s
$\tau_3$=4.10$^{-2}$ s
Number of electrodes in the plasmatron: 3
Interior: diameter of the reactor: 1 m
Diameter of cylinder containing the electrodes: 0.2 m
Diameter of the turns in the plasma jet spiral: 0.8 m
Diameter of the turns in the spiral of fragments to be treated: 0.8 m
Reverse flows of plasma and the gas carrying the fragments.
Characteristic dimensions of the fragments entering the reactor: ~0.01 m
Parameters of the reactor calculated according to the recommendations of this invention and implemented on the reactor:
  Angle α calculated using formulas [3] and [4]: ~30°
  Angle β calculated using formulas [5] and [6]: ~20°
Fragment throughput rate: 1 T/h
Syngas formation temperature: ~900° C.
Syngas (CO+$H_2$) produced: ~0.2 kg/s.

Conclusions drawn from these examples:
1. The implementation of this invention enables lengths and volumes to be obtained for non-isothermal plasma jets according to formulas (1)-(3) in this invention of the order of several meters, which enables the plasma to be moved in a spiral which mixes advantageously with the flow of carrier gas laden with fragmented or pulverized material to be treated.
2. The angles of entry of the plasma jet and the flow of carrier gas laden with fragments of material to be treated, as calculated according to the recommendations given in this invention enable the aims of the invention to be achieved.
3. In the case where the method and the corresponding device are implemented with for the purpose of producing particles of solid fuel from the jet of carrier gas laden with fragments of material to be treated, this invention enables powders with the desired particle sizes to be produced by following the recommendations established.
4. The PIT plasmatron designed for this purpose and supplied as recommended in this invention has proved to be effective in the different embodiments implemented in practice, in particular as a plasma-assisted burner, which can advantageously be used to supply power plant boilers.
5. The method claimed and the device for implementing it, as used in in these examples, enable the aims of this invention to be achieved. In particular, the examples provided have shown that they can be exploited in different embodiments, in particular, but without being limited for all that, to produce fuel powders such as torrefied wood powder and fuel gases such as syngas.

The invention claimed is:
1. Method for treating fragmented or pulverized material in a reactor of cylindrical or conical shape, achieved by a rotational reactive flow and a flow of support gas laden with the fragmented material or pulverized elements set in at least two initially independent helical jets that mix with each other a distance away from where they are formed, wherein the rotational reactive flow comprises one or more continuous jet(s) (j) of nonthermal reactive plasma, quasi-stable, at intermediate temperatures (PIT), produced by PIT plasmatrons supplied by alternating current and operating at a pressure at least equal to atmospheric pressure, PIT plasma travelling in a turbulent movement along a helical trajectory or trajectories with a diameter $D_e$ at an angle α relative to a plane perpendicular to an axis of symmetry of the reactor and wherein the flow of fragmented material is propelled the at least two helical jets (i) of support gas according to helical trajectories with a diameter D at an angle β relative to the plane perpendicular to the axis of symmetry of the reactor, angles α and β being chosen according to a speed U of the flow rate of the incoming fragmented material or pulverized elements, G, the speeds of the propellant U, the speed of the plasma jet(s), Vs, the average characteristic dimension of the incoming fragments of material, I, the length of the reactor of reaction zone Y, under the conditions of fullness of the reactions:

$$\alpha(\pm 10\%)=\arc \sin(Y/j\Lambda)$$

$$\beta(\pm 15\%)=\arc \sin U\cdot c\cdot \delta\cdot \Delta Tf/iY\cdot Q_p$$

in which
  i is a number of jets of flow laden with fragments introduced simultaneously into the reactor;
  j is the number of PIT plasma jets or the number of plasmatrons operating in parallel;
  U is the speed of the incoming stream of fragments (m/s);
  Λ is the length (expressed in m) of the jet(s) of nonthermal plasma (PIT) at intermediate temperatures, given by the empirical formula $\Lambda = k_p(U\ I)^{0,3} D_e^{0,2} V_s^{0,3}$);
  Y is the length of the reactor (m);
  $Q_p$ is the density (expressed in W/m²) of energy flow imparted to the fragments by the plasma, given by the formula $Q_p=(1/3)(kT_1)^{0,5}\cdot m_1^{-0,5}\cdot E/1\cdot \sigma$;
  c is a specific heat capacity of the fragmented or pulverized material (J/m³·K);
  De is an average diameter of the spiral along which the plasma travels, calculated as half the sum of the minimum and maximum diameters of the spiral in the case of a conical reactor) (m);
  Vs is the speed of the gas supply to the plasmatron(s);
  δ is the depth of the treatment effected on the fragments of material (m);
  ΔTf determines an increase in temperature (in degrees) of the fraction (δ) of fragment treated as the difference between the initial temperature of the incoming material and the temperature required at the end of the treatment carried out under a non-stationary thermal regime;

U is the amplitude, averaged over time, of the voltage at the electrodes given by the plasma jet generator(s) (in V);

I is the amplitude, averaged over time, of the corresponding intensity of the current that passes through them (in A);

$T_1$ is the average temperature of the heavy particles in the plasma (in practice ~2000K);

$m_1$ is the average mass of the heavy particles in the plasma (kg);

E (~$kT_1$) is a quantity of plasma-chemical energy imparted by the heavy particles in the plasma to a fragment of material or to a pulverized element (J);

Te is the temperature of the electrons in the plasma (PIT) at intermediate temperatures (K);

l is the average size of the fragments or pulverized elements;

σ is the diffusion cross section of the particles of plasma (in practice, in the air, σ~$10^{-19}$ $m^2$);

k is the Boltzmann constant (k=1.38 $10^{-23}$ J/K); and $k_p$ is an empirical coefficient ($k_p$~6.31 $10^{-2}$ $m_1^{0.5}$ $J^{-0.3}$ $s^{0.3}$).

2. Method according to claim 1, further comprising:

supplying the jets of PIT nonthermal plasma at intermediate temperatures, propelled into their helical movement, by bipolar pulse alternating voltage and current, each pulse consisting of a wave packet with respective amplitudes U between 0.1 and 100 kV, and I between 0.1 and 30 A, generated at a frequency $v_1$ between 50 Hz and 100 MHz, the values U, I, and $v_1$ being sufficient to initiate the plasma by a short-circuit spark, and whose duration $\tau_2$ between 1 and 1000 ms, is sufficiently long to reach a given temperature $T_1$ within $1000 \leq T_1 \leq 6000$ K and lower than the temperature of the isothermal stationary plasma (in thermodynamic equilibrium) generated at the frequency $v_1$, the pulses being repeated at interlapses $\tau_3$ between 1 and 1000 ms, shorter than the plasma relaxation time, $\tau_3$ being equal to the maximum duration of the recombination of the electrons with the ions generated in the plasma, the characteristic pulse generation times being subject to the relationships:

$\tau_1$ (=$1/v_1$), this generation being one of bipolar waves at high frequency, sinusoidal, square, sawtooth;

$\tau_2 = ../U.I.$ in which $\Psi = n_{pl}(kT_1)W_{pl}$ is the quantity of energy contained in the jet of plasma with a volume $W_{pl}$ and a molecular density $n_{pl}$ (typically, at atmospheric pressure, $\Psi$~$10^3$ J);

$\tau_3 \leq \tau \sim (kT_1)^{-1.5}(m_1)^{0.5} P\sigma_p$.

in which $\sigma_p$ is the average recombination cross section of the electrons with the ions in the plasma ($\sigma_p$~$10^{-20}$ $m^2$);

P is the pressure (P≥$10^5$ Pa), k is the Boltzmann constant (k=1.38 $10^{-23}$ J/K), $T_1$ is the average temperature of the heavy particles in the plasma (T~2 $10^3$ K), and this mode of supply being achievable when $v_1$=50 Hz, $\tau_1 = \tau_2 = \tau_3 = 0.02$ s.

3. Method according to claim 1, further comprising:

trapping the solid particles resulting from the method in the reactor and treated until they are smaller than a chosen limit size $l_0$, $l_0$;

automatically selecting and evacuating the solid particles via an axial duct with a diameter d, the choice of the parameters of the reactor to do this being subject to the equation:

$l_0 = (tg\beta)^2(\rho_g/\rho_c)d^3/4D^2$;

in which $\rho_g$ and $\rho_c$ are respectively the average densities of the gas phase and the solid phase (material of the fragments) present in the reactor; and D is the diameter of the spiral along which the fragments of material to be treated are introduced into the reactor.

4. Method according to claim 1, wherein the gas propellant and/or the plasma support gas are constituted by a part or all of the gas resulting from the treatment, returned to the reactor inlet after its formation in the reactor, its cooling if necessary and its passage through a compression system.

5. Method according to claim 1, wherein the angles α and β are equal, and the flow of plasma from the PIT plasmatron and the flow of gas carrying the fragments to be treated are coaxial and in particular have the same direction of propagation.

6. Device for implementing the method according to claim 1, wherein the rotational flow of reactive gas is created by one or more PIT plasmatrons (1) provided with electrodes (11), plasmatrons fixed onto the reactor by fastening means (for example 26) so that the jet(s) of plasma (7) that it generates are directed at an angle α relative to the plane perpendicular to the axis of the reactor, and so that the flow of support gas laden with fragmented material or pulverized elements (5) set in helical movement (8) is directed by a duct (4) fixed by fastening means (26') at an angle β relative to the plane perpendicular to the axis of the reactor.

7. Device according to claim 2, wherein the PIT plasmatron whose electrodes, numbering two, three or six, are provided with pins (54), a minimum distance between which is variable by rotating them to generate the short-circuit spark at different pressures, is supplied by an electric pulse generator (10) containing means of limiting the current amplitude and systems of transistors (3) enabling the electric pulses to be formed according to claim 2 as well as the means of measuring the parameters recited to enable them to be optimized.

8. Device according to claim 3, wherein an outlet duct (9) for the products created in the reactor is built so that its interior diameter d is limited according to the diameter D of the spirals (8) formed by the flow of carrier gas laden with fragments or pulverized elements (5), the required dimension $l_0$ of the particles to be produced in the reactor and the densities $\rho_c$ and $\rho_g$ of the material of the fragments or pulverized elements treated and of the carrier gas, being determined according to the formula $d \leq [4D^2l_0/(tg\beta)^2(\rho_g/\rho_c)]^{1/3}$.

9. Device according to claim 1, wherein the propulsion of the fragments (5) is effected mechanically an endless screw and wherein the progression of the fragments treated (5) is organized so that in their movement said fragments collide with each other and are crushed due to the presence of protuberances (31) on the inner wall of the reactor or a crusher installed in the duct returning insufficiently treated fragments to the reactor inlet.

10. Device according to claim 1, wherein the reactor is provided with ducts ((23), (43)) and an apparatus (compressor (41), heat exchanger or cooler (42), valves (39')) enabling the return to the reactor inlet of the gaseous products, as well as ducts and accumulation containers (9',

23, 27) configured to collect and return to the reactor inlet and retreat any solid products not totally treated.

11. Device according to claim 1, configured to treat fine dust (5) conveyed by a flow of carrier gas (air) a device in which the angles $\alpha$ and $\beta$ are substantially equal to 90° and wherein the plasmatron (1) is surrounded by a coaxial duct (43) enabling the flow of plasma produced by the plasmatron (1) to be structured and its mixing with the flow of carrier gas (4) laden with particles (5) or any flow of gas necessary to the production of the plasma-chemical reactions in the reactor to be organized.

\* \* \* \* \*